US008814238B2

(12) United States Patent
Tygard

(10) Patent No.: US 8,814,238 B2
(45) Date of Patent: Aug. 26, 2014

(54) CLAMPING APPARATUS

(75) Inventor: Edward Tygard, McMurray, PA (US)

(73) Assignee: Tygard Machine & Manufacturing Company, Washington, PA (US)

( * ) Notice: Subject to any disclaimer, the term of this patent is extended or adjusted under 35 U.S.C. 154(b) by 0 days.

(21) Appl. No.: 13/444,072

(22) Filed: Apr. 11, 2012

(65) Prior Publication Data

US 2012/0263563 A1 Oct. 18, 2012

Related U.S. Application Data

(60) Provisional application No. 61/457,489, filed on Apr. 11, 2011.

(51) Int. Cl.
*B25J 15/02* (2006.01)

(52) U.S. Cl.
USPC .......................... 294/81.51; 414/607; 414/912

(58) Field of Classification Search
USPC .............. 294/119.1, 81.1–81.3, 81.54, 81.62, 294/67.33, 67.5, 902, 81.41, 81.51, 198; 414/620, 621, 624, 632, 637, 665, 739, 414/741, 607, 912
See application file for complete search history.

(56) References Cited

U.S. PATENT DOCUMENTS

| | | | | |
|---|---|---|---|---|
| 1,822,629 | A * | 9/1931 | McIlvried | 294/106 |
| 3,194,422 | A | 7/1965 | Shinn | 414/621 |
| 3,262,595 | A | 7/1966 | Seip et al. | 414/621 |
| 3,453,017 | A * | 7/1969 | Nagy | 294/81.41 |
| 3,458,229 | A * | 7/1969 | Cooper et al. | 294/81.2 |
| 4,252,496 | A | 2/1981 | Williams | 414/623 |
| 4,331,320 | A | 5/1982 | Naruse et al. | 254/2 R |
| 5,354,112 | A * | 10/1994 | Hara et al. | 294/81.41 |
| 5,429,490 | A * | 7/1995 | Myers et al. | 425/436 R |
| 6,749,392 | B1 * | 6/2004 | Adams et al. | 414/800 |
| 7,537,427 | B2 | 5/2009 | Tygard | 414/623 |
| 7,993,094 | B2 | 8/2011 | Tygard | 414/785 |

* cited by examiner

*Primary Examiner* — Stephen Vu
(74) *Attorney, Agent, or Firm* — Michael Tobias

(57) ABSTRACT

A clamping apparatus has a frame and a plurality of clamping arms mounted on the frame for grasping and releasing a load. The frame defines an opening through which a load grasped by the clamping arms can pass to above the frame.

19 Claims, 4 Drawing Sheets

CLAMPING APPARATUS

REFERENCE TO RELATED APPLICATIONS

This application claims the benefit of U.S. Provisional Application No. 61/457,489 filed on Apr. 11, 2011, the disclosure of which is incorporated by reference.

BACKGROUND OF THE INVENTION

This invention relates to a clamping apparatus for use in releasably grasping a load to be lifted from two or more sides of the load.

Various clamping apparatuses have been developed for use in lifting loads. Among these clamping apparatuses are ones having a plurality of clamping arms which can releasably grasp a load to be lifted from multiple sides. In some cases, the clamping arms pivot between an open and closed position. In other cases, the clamping arms translate without pivoting along a linear or other path between an open and closed position.

With clamping apparatuses of the type having movable clamping arms which have been proposed in the past, the height of the load that can be lifted by the clamping arms is limited by the length of the clamping arms. The taller is the load, the longer the clamping arms need to be. As the clamping arms become longer, the clamping apparatus as a whole becomes more bulky and more difficult to maneuver. In addition, as the length of the clamping arms increases, the bending moments applied to the clamping arms increase, and the clamping arms need to be heavier to resist the increased bending moments. Furthermore, the longer are the clamping arms, the higher the clamping apparatus must be lifted in order to clear the top of a load to be lifted or in order to avoid collisions with other items when the clamping apparatus is being transported or maneuvered. This imposes limitations on the equipment used to manipulate the clamping apparatus and the height of the workplace in which the clamping apparatus is used.

SUMMARY OF THE INVENTION

The present invention provides a clamping apparatus in which the height of a load which can be lifted by the clamping apparatus is not limited by the length of the clamping arms of the clamping apparatus.

The present invention also provides a clamping apparatus which can be compact and light weight in spite of being able to handle a tall and heavy load.

The present invention additionally provides a method of grasping a load using a clamping apparatus.

According to one form of the present invention, a clamping apparatus includes a frame having an opening through which a load can pass, at least one pair of clamping arms mounted on the frame for grasping and release a load, and at least one actuator connected to the clamping arms for moving the clamping arms towards and away from each other.

The opening in the frame is preferably large enough to contain an imaginary rectangle having dimensions of at least 24×24 inches, more preferably at least 30×38 inches, and still more preferably at least 40×48 inches as viewed in plan.

The clamping arms are not restricted to any particular type of movement in order to grasp and release a load. In a preferred embodiment, the clamping arms are pivotably mounted on the frame.

In another form of the present invention, a method of grasping a load includes contacting opposite sides of a load with the clamping arms of a clamping apparatus according to the present invention with the load extending above the frame. Preferably the load is capable of extending at least 12 inches and more preferably at least 24 inches above the frame.

A clamping apparatus according to the present invention is particularly suitable for use with a lift truck (also referred to as a fork lift). However, the clamping apparatus can be used with any mechanism capable of raising and lowering the clamping apparatus together with a load held by the clamping apparatus, such as a crane, a boom, a davit, or a robot arm.

A load which can be lifted by a clamping apparatus according to the present invention is not restricted to any particular type or shape of object. Some examples of objects with which the clamping apparatus can be employed are beverages such as soft drinks or beer, groceries, bricks, lumber, barrels, bottles, and other cylindrical objects, bales, stacks of paper products, and boxes, cartons, and packages of various types of merchandise. The object or objects to be lifted may be arranged in one or more layers, such as when a load comprises a plurality of boxes of merchandise stacked on a shipping pallet in a plurality of layers, but the clamping apparatus can also be used to lift a single object, such as a single box. Thus, the present invention can be used with virtually any objects which can be grasped from a plurality of sides.

When the clamping apparatus is intended for use in grasping a four-sided load, it will typically have an even number of clamping arms, such as two or four clamping arms arranged in opposing pairs. However, the number of clamping arms and their orientation with respect to each other is not restricted. For example, if the clamping apparatus is intended for use in grasping a round object such as a barrel, it may have an odd number of clamping arms, such as three.

DESCRIPTION OF PREFERRED EMBODIMENTS

Figure 1:
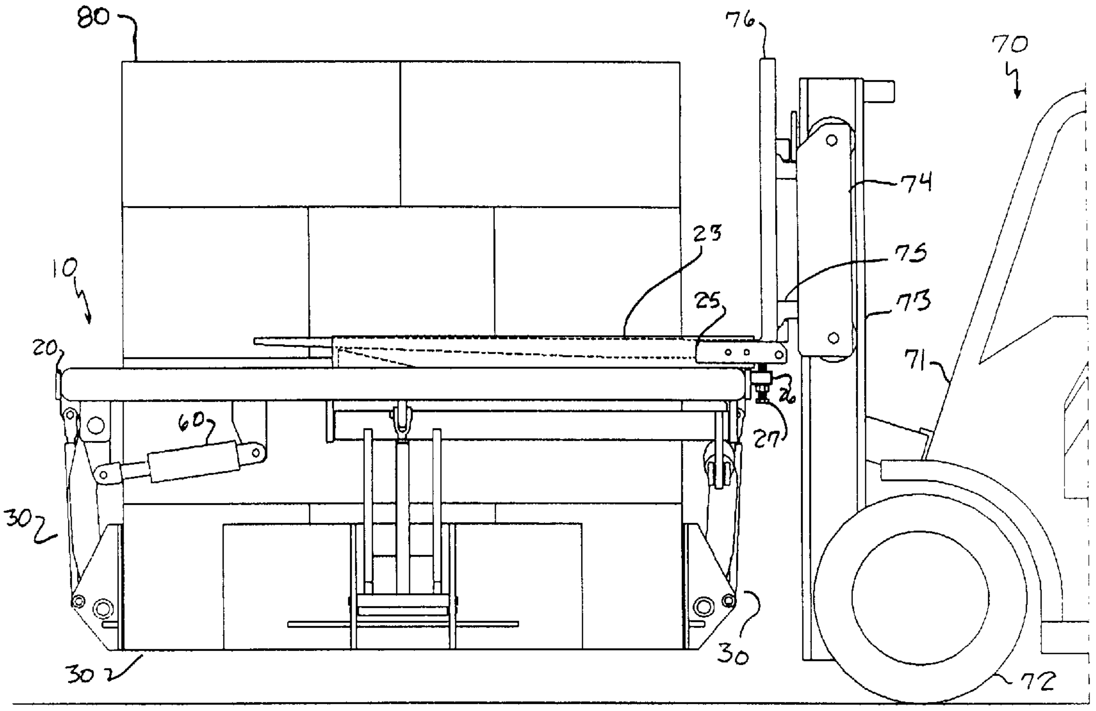
FIG. 1 is a side elevation of an embodiment of a clamping apparatus according to the present invention mounted on a lift truck and carrying a load comprising a plurality of layers of boxes.

Preferred embodiments of a clamping apparatus according to the present invention will be described while referring to the accompanying drawings. FIGS. 1-6 illustrate one embodiment of a clamping apparatus 10, which includes a frame 20 and a plurality of clamping arms 30 pivotably mounted on the frame 20 so as to be able to grasp and release a load 80. The present embodiment includes four clamping arms 30 arranged in two pairs, with each clamping arm 30 disposed on an opposite side of the frame 20 from another one of the clamping arms 30.

Figure 6:
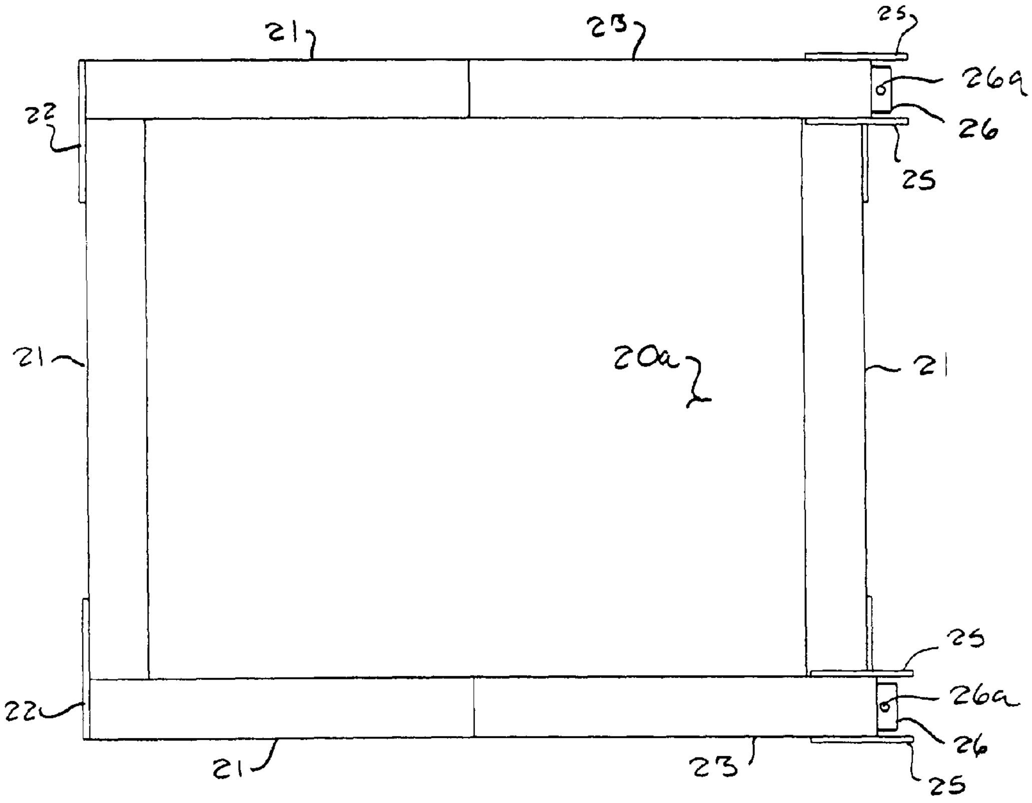
FIG. 6 is a plan view of the frame of the embodiment of FIG. 1.

The frame 20 has a size and a shape such that a load to be lifted by the clamping apparatus 10 can pass vertically through an opening 20*a* (shown in FIG. 6) defined by the frame 20 to above the top of the frame 20. Loads of merchandise shipped on pallets are frequently rectangular (including square) as viewed in plan, so as shown in FIG. 6, the illustrated frame 20 has a rectangular shape as viewed in plan. However, many other shapes for the frame 20 are possible, such as circular, oblong, or a polygonal shape other than a rectangle. Pallets used in the beverage and grocery industries are frequently rectangular with a length which is greater than the width, so the illustrated frame 20 likewise has a length which is greater than its width, but the frame 20 could instead be square. The inner dimensions of the frame 20 are preferably somewhat larger than the dimensions of the load to be grasped by the clamping apparatus 10 so that the load can pass vertically through the frame 20 without abrasion.

As an example, a frame 20 with inner dimensions of 47×55 inches is easy to use in gripping a load on a standard 40×48 inch pallet commonly used in the grocery industry. In order to enable the clamping apparatus 10 to grasp a wide range of merchandise commonly transported in the beverage and grocery industries, the opening 20*a* in the frame 20 is preferably large enough to surround an imaginary rectangle having dimensions as viewed in plan of at least 24×24 inches, more preferably at least 32×38 inches, and still more preferably at least 40×48 inches. The opening 20*a* in the frame 20 may be yet larger, such as large enough to surround an imaginary rectangle measuring 48×48 inches.

The frame 20 may have any structure which gives it sufficient strength and rigidity to support a load. The illustrated frame 20 comprises four legs 21 comprising hollow steel tubes which are rigidly secured to each other at their ends at right angles to each other to form a rigid structure. Reinforcing plates 22 are secured to the ends of the legs 21 at the lengthwise ends of the frame 20 to reinforce the corners and to cover the open ends of the tubes forming the legs 21.

Figure 2:
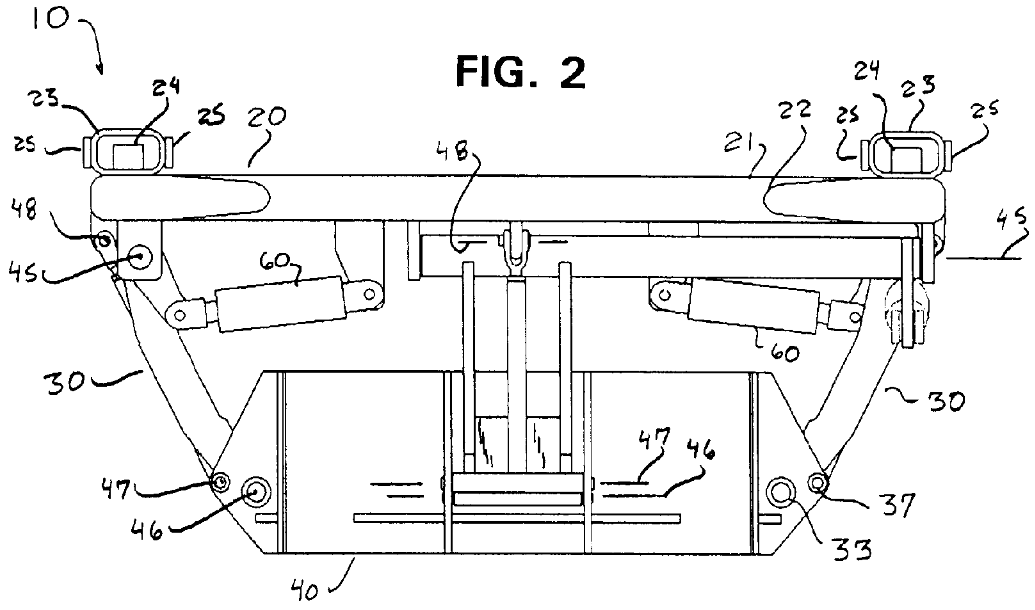
FIG. 2 is an end elevation of the embodiment of FIG. 1 as viewed from the left in FIG. 1 with the clamping arms of the clamping apparatus in a fully closed position.
Figure 3:
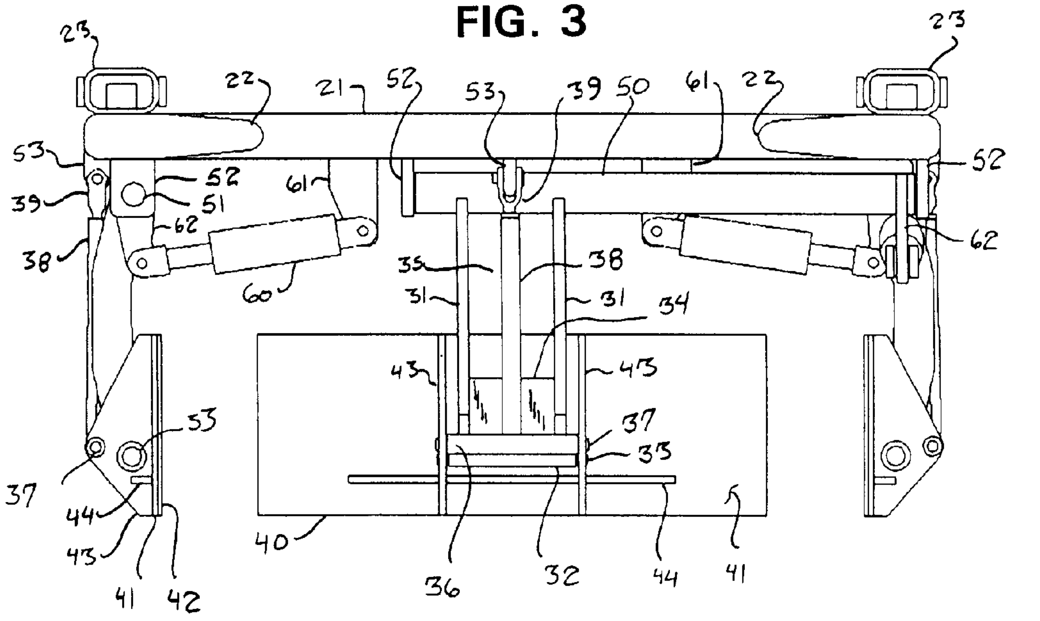
FIG. 3 is an end elevation of the embodiment of FIG. 1 as viewed from the left in FIG. 1 with the clamping arms in a fully open position.

The clamping arms 30 can have any structure which enables them to grasp and release a desired load. The illustrated clamping arms 30 are similar in structure to the clamping arms disclosed in U.S. Pat. No. 7,537,427 entitled "Clamping Apparatus", the disclosure of which is incorporated by reference. As shown in FIGS. 2 and 3, for example, each of the clamping arms 30 includes two elongated lever portions 31, a control rod 35 disposed between and extending alongside the two lever portions 31, and a contact portion 40 pivotably supported at the lower ends of the lever portions 31 and the control rod 35. The upper end of each lever portion 31 is pivotable with respect to the frame 20 about a first axis 45, and the lower end of each lever portion 31 is pivotable with respect to the contact portion 40 about a second axis 46. The lower end of the control rod 35 is pivotable with respect to the contact portion 40 about a third axis 47, and the upper end of the control rod 35 is pivotable with respect to the frame 20 about a fourth axis 48. The first through fourth axes 45-48 are all horizontal and parallel to each other. Each of the clamping arms 30 thus constitutes a four-bar linkage having four pivot points coinciding with the first through fourth axes 45-48. The linkage can be made a parallel linkage by selecting the dimensions of the components of each clamping arm 30 so that an imaginary quadrilateral connecting the four axes 45-48 is a parallelogram. However, the linkage need not be a parallel linkage. When each linkage is a parallel linkage, the angle of the contact portion 40 of each clamping arm 30 with respect to the vertical remains constant as the clamping arm 30 pivots with respect to the frame 20. The load applied to the control rod 35 when a clamping arm 30 is grasping a load will typically be less than that applied to the lever portions 31, so the control rod 35 can generally be of lighter construction than the lever portions 31. The control rod 35 is preferably sufficiently stiff to prevent the contact portion 40 from rotating about the lower end of the lever portions 31 under forces applied to the contact portion 40 when it is pressed against the side of a load which is to be grasped by the clamping apparatus 10.

As shown in FIG. 3, for example, each contact portion 40 includes an elongated rigid panel 41 and a resilient pad 42 of rubber or similar material on the inner surface of the panel 41 to provide cushioning and a good grip with respect to a load. A pair of mounting lugs 43 are mounted on the outer surface of each panel 41. The lower end of each lever portion 31 is secured to a horizontal tube 32. The tube 32 is rotatable about a shaft 33 which is supported at its ends by the two mounting lugs 43 to provide a pivotable connection between the lever portions 31 and the contact portion 40 about the second axis 46. Similarly, the lower end of each control rod 35 is secured to a horizontal tube 36 which is rotatable about a shaft 37 which is supported at its ends by the two mounting lugs 43 to provide a pivotable connection between the control rod 35 and the contact portion 40 about the third axis 47. In this embodiment, a stiffener 34 extends between the two lever portions 31, and another stiffener 44 is provided on the outer surface of the panel 41 of each contact portion 40.

The upper end of each lever portion 31 is secured to a tube 50, which is rotatable about a shaft 51 centered on the first axis 45. The shaft 51 is supported at its ends by two mounting brackets 52 secured to and extending downwards from one of the legs 21 of the frame 20 to provide a pivotable connection between the lever portions 31 and the frame 20 about the first axis 45.

The upper end of each control rod 35 is pivotably connected to a mounting bracket 53 secured to one of the legs 21 of the frame 20 to provide a pivotable connection between the control rod 35 and the frame 20 about the fourth axis 48.

The control rod 35 may have a structure which enables it to be varied in length in order to adjust the angle of the inner surface of the contact portion 40 with respect to the vertical. In the illustrated embodiment, each control rod 35 includes a tube 38 and a clevis 39 secured to the upper end of the tube 38. The clevis 39 has a threaded shank which can be screwed into a nut secured to the upper end of the tube 38, and the clevis 39 can be prevented from rotating with respect to the tube 38 by a lock nut. The clevis 39 can be screwed into or out of the nut at the end of the tube 38 to adjust the overall length of the control rod 35.

A plurality of actuators are provided for pivoting the clamping arms 30 with respect to the frame 20. A separate actuator can be provided for each clamping arm 30, or a single actuator can be used to operate a plurality of the clamping arms 30. In the present embodiment, the actuators comprise hydraulic cylinders 60 connected to an unillustrated source of hydraulic fluid by unillustrated hydraulic lines. When the clamping apparatus is intended to mounted on a lift truck, the hydraulic tank of the lift truck can conveniently be used as a source of hydraulic fluid, such as with the clamping apparatus sold by Tygard Machine & Manufacturing Co. as the Tygard Claw. Each hydraulic cylinder 60 has a first end pivotably connected to a bracket 61 extending downwards from the frame 20 and a second end pivotably connected to a lever 62 which is secured to and extends downwards from one of the tubes 50 supporting the clamping arms 30. The two ends of the hydraulic cylinder 60 are connected to the bracket 61 and the lever 62 for pivoting with a single degree of freedom, but one or both ends of the hydraulic cylinder may have a connection which permits pivoting with multiple degrees of freedom. The hydraulic cylinders 60 exert a linear drive force on the levers 62 to pivot the clamping arms 30, but actuators which generate a rotational drive force can also be used. Some examples of other types of actuators which can be employed are pneumatic cylinders, hydraulic motors, pneumatic motors, and electric motors. Mechanisms for driving and controlling a variety of actuators are well known to those skilled in the art, and any suitable such mechanisms can be employed for the actuators in the present invention.

Figure 4:
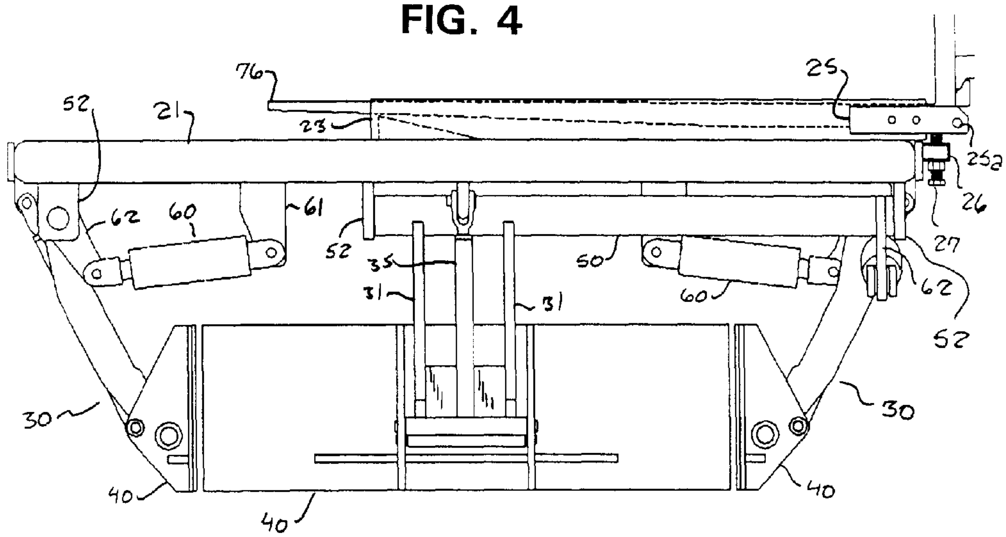
FIG. 4 is a side elevation of the embodiment of FIG. 1 with the clamping arms of the clamping apparatus in a fully closed position.
Figure 5:
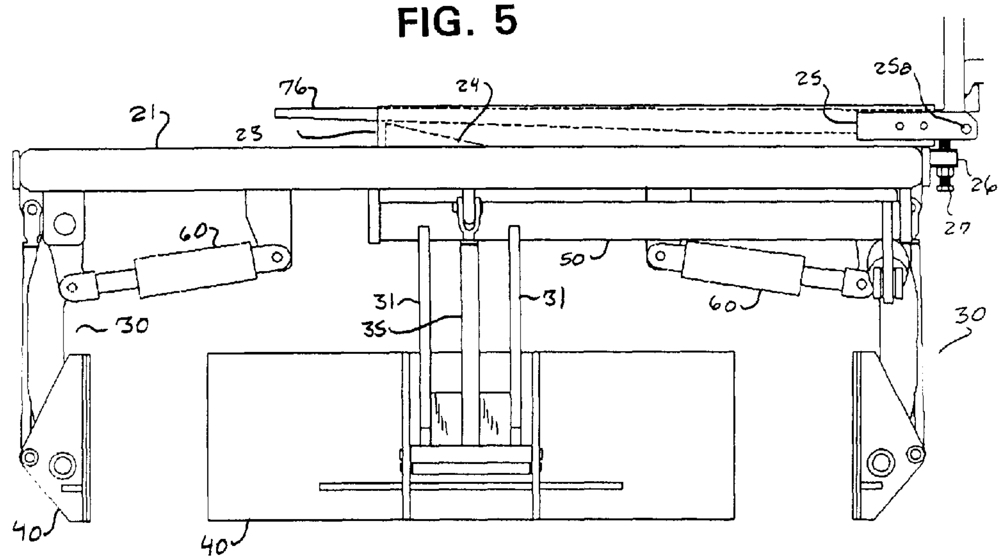
FIG. 5 is a side elevation of the embodiment of FIG. 1 with the clamping arms of the clamping apparatus in a fully open position.

The hydraulic cylinders 60 can be extended and retracted to pivot the clamping arms 30 between the fully closed positions shown in FIGS. 2 and 4 in which the contact portions 40 of opposing clamping arms 30 have a minimum separation and the fully open positions shown in FIGS. 3 and 5 in which the contact portions 40 of opposing clamping arms 30 have a maximum separation. The clamping arms 30 can also assume partially closed positions in which the separation between opposing contact portions 40 is between the maximum and minimum separations.

As viewed in plan, the inner surfaces of the contact portions 40 in the present embodiment coincide with the sides of an imaginary rectangle. When the clamping arms 30 are in their fully open positions, the imaginary rectangle is preferably at least as large as the outer dimensions as viewed in plan of the largest load that it is desired for the clamping apparatus 10 to lift. When the clamping arms 30 are in their fully closed position, the imaginary rectangle is preferably somewhat smaller than the outer dimensions as viewed in plan of the smallest load that it is desired for the clamping apparatus 10 to lift. The opening 20*a* defined by the frame 20 is preferably no smaller than the imaginary rectangle defined by the contact portions 40 when the clamping arms 30 are in their fully open position so that the largest load to be grasped by the clamping arms 30 can pass vertically through the opening 20*a* to above the frame 20. In the illustrated embodiment, the separation between the left and right opposing contact portions 40 in FIGS. 2 and 3 is 31 inches in the fully closed position and 47 inches in the fully open position. These contact portions 40 can grip a load having a distance between opposite sides of the load ranging from slightly greater than 31 inches to somewhat less than 47 inches. The separation between the left and right opposing contact portions 40 in FIGS. 4 and 5 is 39 inches in the fully closed position and 55 inches in the fully open position. These contact portions 40 can grip a load having a distance between opposite sides of the load ranging from slightly greater than 39 inches to somewhat less than 55 inches. These separations enable the clamping apparatus 10 to easily handle typical loads carried on a standard 40×48 inch pallet for groceries, which will typically have dimensions of no greater than that of the pallet. If the dimensions of the imaginary rectangle defined by the contact portions 40 when the clamping arms 30 are in their fully open positions are 47×55 inches as in the present embodiment, the clamping apparatus 10 can be lowered over a load having dimensions of 40×48 inches as viewed in plan with ample clearance between the outer periphery of the load and the inner surfaces of the contact portions 40, thereby reducing the possibility of the contact portions 40 striking against the load. In the embodiment shown in FIGS. 2-5, each of the hydraulic cylinders 60 is mounted directly underneath one of the legs 21 of the frame 20 and does not extend beyond the inner periphery of the frame 20 as viewed in plan. Therefore, the hydraulic cylinders 60 are completely out of the way of any load which can pass vertically through the opening 20*a* in the frame 20. In addition, the structure for supporting the clamping arms 30 and the hydraulic cylinders 60, such as tubes 50 and brackets 52, 53, and 61, are disposed outside of the above-described imaginary rectangle defined by the inner surfaces of the contact portions 40 when the clamping arms 30 are in their fully open positions as viewed in plan so that when the clamping apparatus 10 is lowered over a load, the load will not strike against any of these portions, thereby preventing damage to the load as well as to these portions.

The clamping apparatus 10 can be supported by any suitable device capable of positioning the clamping apparatus 10 with respect to a load and then lifting the clamping apparatus 10 and the load gripped by the clamping apparatus 10. One example of a suitable device for supporting the clamping apparatus 10 is a lift truck. There is no particular limitation on a method of mounting the clamping apparatus 10 on a lift truck, but in the present embodiment, the clamping apparatus 10 is capable of being directly supported by the forks of a lift truck. As shown in the figures, fork-engaging members comprising two parallel fork-receiving tubes 23 are secured to the top surfaces of two of the legs 21 of the frame 20. Each tube 23 has dimensions such that a standard fork 76 of a lift truck 70 can be loosely inserted into the tube 23, and the horizontal separation between the two tubes 23 is within the range in which the horizontal separation between the forks of a lift truck can be adjusted. As shown in FIGS. 4 and 5, each fork-receiving tube 23 has a pair of vertical plates 25 secured to one of its ends, with the two plates 25 having aligned holes 25*a* for receiving an unillustrated removable retaining member, such as a pin or a bolt. When a fork 76 is inserted into one of the tubes 23, a retaining member can be inserted through the aligned holes 25*a* behind the vertical portion of the fork 76 to prevent the clamping apparatus 10 from translating along the fork 76. A horizontal plate 26 is secured to the frame 20 between the two vertical plates 25 mounted on each tube 23, and a bolt 27 is threadingly mounted in a threaded hole 26*a* in the plate 26. The bolt 27 can be screwed into the plate 26 to make the upper end of the bolt 27 contact the lower surface of the fork 76, and the bolt 27 can be locked in this position by a lock nut. At the opposite end of each fork-receiving tube 23, a ramp 24 formed from a plate is disposed inside the tube 23 and secured to the interior of the tube 23. When a fork 76 is inserted into the tube 23, the tapered end of the horizontal portion of the fork 76 contacts the ramp 24, and the tapered end rides up along the ramp 24 until the upper surface of the horizontal portion of the fork 76 contacts or is in close proximity to the upper inner surface of the tube 23. The combination of the ramp 24 at one end of the tube 23 and the bolt at the other end eliminate or reduce play between the top surface of the fork 76 and the upper inner surface of the fork-receiving tube 23. Examples of fork-receiving tubes for use in mounting a clamping apparatus on a lift truck are described in U.S. Pat. No. 7,993,094, which is incorporated by reference, and similar fork-receiving tubes can also be used in the present invention.

A fork-engaging member is not restricted to the fork-receiving tubes 23, and any members into which the forks 76 of a lift truck can be inserted to support the weight of the clamping apparatus 10 can be employed. In addition, the fork-receiving tubes 23 need not be mounted on the top surface of the frame 20. For example, they could be mounted on the sides or lower surface of the frame 20.

FIG. 1 is a side elevation showing the clamping apparatus 10 mounted on a lift truck 70 and supporting a load 80 comprising a plurality of layers of boxes of merchandise. The lift truck 70, which may be of conventional structure, has a body 71 and a plurality of wheels 72 (usually four wheels, only one of which is shown). As is typical with a lift truck, a mast 73 is mounted on the front end of the truck body 71, and a carriage

74 is mounted on the mast 73 so as to be raised and lowered along the mast 73 by an unillustrated conventional drive mechanism, such as one employing a hydraulic cylinder. The front side of the carriage 74 is equipped with a plurality of horizontal mounting bars 75, and a pair of forks 76 are mounted on the mounting bars 75 in a conventional manner so as to extend in the fore-and-aft direction of the lift truck 70. Instead of the forks 76 being directly mounted on the carriage 74 of the lift truck 70, they may be mounted on a side shifter, which may be of known structure, which in turn is mounted on the mounting bars 75 of the carriage 74 in a conventional manner to enable the positions of the forks 76 to be adjusted in the widthwise direction of the lift truck 70. The clamping arms 30 of the clamping apparatus 10 are shown grasping the lowest layer of boxes in the load 80, with the load 80 extending through the rectangular opening 20*a* defined by the frame 20 to above the frame 20.

In order to mount the clamping apparatus 10 on the lift truck 70, the clamping apparatus 10 is first placed in a substantially horizontal attitude with the contact portions 40 of the clamping arms 30 resting on a floor or other support surface where the clamping apparatus 10 can be approached by the lift truck 70. The lift truck 70 is then maneuvered so that each fork 76 of the lift truck 70 is aligned with one of the fork-receiving tubes 23 of the clamping apparatus 10, and the lift truck 70 is then driven forward to insert each fork 76 into a corresponding one of the tubes 23. The lift truck 70 continues to move forwards until the tapered ends of the forks 76 extend from the tubes 23 and the vertical plates 25 mounted on the tubes 23 are disposed to the rear of the vertical portions of the forks 76. Unillustrated retaining members such as pins or bolts are then inserted into the aligned holes 25*a* in the plates 25 to prevent the clamping apparatus 10 from translating with respect to the forks 76 in the fore-and-aft direction of the lift truck 70. The forks 76 are then slightly raised along the mast 73 far enough to bring the upper surface of the horizontal portion of each fork 76 into contact with the top inner surface of the corresponding fork-receiving tube 23. For example, the forks 76 can be raised far enough to lift the clamping apparatus 10 off the support surface on which it was resting so that the weight of the clamping apparatus 10 is supported entirely by the forks 76. In this state, the bolts 27 mounted in the horizontal plates 26 can be screwed upwards to bring the upper end of each bolt 27 into contact with the bottom surface of the corresponding fork 76 to reduce the vertical play between the top surface of the fork 76 and the bottom inner surface of the fork-receiving tube 23. Once the clamping apparatus 10 is mounted on the lift truck 70, the clamping apparatus 10 can be moved around a workplace to handle loads.

When it is desired to grasp a load using the clamping apparatus 10, the clamping apparatus 10 is positioned by the fork lift 70, for example, above a load (such as a stack of boxes disposed atop a pallet) with the clamping arms 30 in the fully open positions shown in FIGS. 3 and 5 and with the lower ends of the contact portions 40 of the clamping arms 30 disposed higher than the top surface of the load. The clamping apparatus 10 is then lowered by the lift truck 70 over the load until each contact portion 40 is disposed opposite one side of the load at a height where it is desired to grasp the load. The actuators 60 are then operated by the operator of the lift truck 70 using an unillustrated hydraulic controller mounted on the lift truck 70 to rotate each of the clamping arms 30 towards the corresponding side of the load and press each of the contact portions 40 against the corresponding side with a force sufficient for the contact portions 40 to grasp the load and support the weight of the load. In this state, the clamping apparatus 10 can then be raised by the lift truck 70 to lift the load off the pallet or other surface on which it is disposed, and the load can be moved by the lift truck 70 together with the clamping apparatus 10 to a desired location. When the load has been placed atop a support surface (such as another pallet) at the desired location, the actuators 60 are operated to pivot the clamping arms 30 back to the fully open positions shown in FIGS. 3 and 5, thereby disengaging the contact portions 40 from the sides of the load and releasing the load. The clamping apparatus 10 can then be raised to above the load and moved to another location to handle another load.

The angle of the contact portions 40 with respect to the sides of a load when contacting a load can be selected in accordance with the type of load, as described, for example, in above-mentioned U.S. Pat. No. 7,537,427. As stated above, this angle can be varied by adjusting the length of the control rods 35.

In previously known clamping apparatuses with clamping arms movably mounted on a frame, the height of a load which can be grasped by the clamping arms is limited by the length of the clamping arms. In contrast, in the present embodiment of a clamping apparatus 10, since a load can extend vertically through the frame 20, the length of the clamping arms 30 is not determined by the height of a load and can be significantly shorter than the height of a load as measured from the point of contact between the contact portions 40 of the clamping arms 30 to the top of the load. This fact makes it possible to significantly decrease the size (particularly the height) and weight of the clamping apparatus 10, thereby making the clamping apparatus 10 easier to handle and reducing the load on a lift truck 70 or other apparatus for supporting the clamping apparatus 10.

In the illustrated embodiment, the clamping apparatus 10 has no obstructions whatsoever above the frame 20, so the only limits on how high a load 80 can extend through the frame 20 to above the clamping apparatus 20 are factors such as the stability of the load 80, the height of the mast 73 of the lift truck 70, and the height of the workplace in which the lift truck 70 is operating. It is possible for the clamping apparatus 10 to include structure above the frame 20 which could limit the maximum height of a load 80, such as a protective net. However, any obstruction is preferably disposed high enough above the frame 20 to enable a load 80 to extend above the frame 20 by at least 12 inches and preferably by at least 24 inches.

What is claimed is:

1. A clamping apparatus comprising:

a frame having an opening through which an imaginary solid having a rectangular shape as viewed in plan with dimensions of at least 24×24 inches as viewed in plan can extend vertically from below the frame to at least 12 inches above the frame without any portion of the apparatus extending into the imaginary solid, the frame extending around an entire outer periphery of the imaginary solid as viewed in plan;

first and second opposing clamping arms pivotably mounted on the frame for pivoting with respect to the frame about parallel horizontal, axes towards and away from each other to grasp and release a load, each of the clamping arms having a contact portion for contacting the load, the clamping arms being pivotable to bring the contact portions of both of the clamping arms into coincidence with opposite surfaces of the imaginary solid at the same time, each of the clamping arms comprising a 4-bar linkage including a lever portion having an upper end pivotably supported by the frame for pivoting with respect to the frame about a first horizontal axis and a lower end pivotably connected to the contact portion for pivoting with respect to the contact portion about a second axis parallel to the first axis, and a control rod having a lower end pivotably connected to the contact portion for pivoting with respect to the contact portion about a third axis parallel to the first axis and an upper end pivotably supported by the frame for pivoting with respect to the frame about a fourth axis parallel to the first axis; and at least one actuator connected to the clamping arms for moving the clamping arms towards and away from each other.

2. The clamping apparatus as claimed in claim 1, wherein the imaginary solid has dimensions of at least 32×38 inches as viewed in plan.

3. The clamping apparatus as claimed in claim 1, wherein the imaginary solid has dimensions of at least 40×48 inches as viewed in plan.

4. The clamping apparatus as claimed in claim 1, including third and fourth opposing clamping arms pivotably mounted on the frame for pivoting with respect to the frame about parallel horizontal axes perpendicular to the horizontal axes of the first and second clamping arms towards and away from each other to grasp and release the load, each of the third and fourth clamping arms having a contact portion for contacting the load, the third and fourth clamping arms being pivotable to bring the contact portions of the third and fourth clamping arms into coincidence with opposite surfaces of the imaginary solid such that the contact portions of all four clamping arms are in coincidence with a different surface of the imaginary solid at the same time.

5. The clamping apparatus as claimed in claim 1, wherein the frame has a rectangular inner and outer periphery as viewed in plan.

6. The clamping apparatus as claimed in claim 1, wherein the imaginary solid can extend vertically through the opening to at least 24 inches above the frame.

7. The clamping apparatus as claimed in claim 1, including a plurality of actuators each connected to one of the clamping arms and each disposed between an inner and outer periphery of the frame as viewed in plan.

8. A method of grasping a load comprising contacting opposite sides of a load with the clamping arms of the clamping apparatus of claim 1 with the load extending above the frame.

9. The method as claimed in claim 8, wherein an inner periphery of the frame is spaced from each portion of the load by at least two inches.

10. The method as claimed in claim 8, wherein the load extends through the opening from below the frame to at least 12 inches above the frame.

11. The method as claimed in claim 8, wherein the load extends through the opening from below the frame to at least 24 inches above the frame.

12. A method of grasping a load comprising contacting the contact portions of the clamping arms of a clamping apparatus as claimed in claim 1 against opposite sides of a load having a height measured from contact points between the contact portions and the sides of the load to a top of the load which is greater than a length of the clamping arms.

13. The clamping apparatus as claimed in claim 1, including two fork receiving members secured to the frame and each extending parallel to a side of the frame for receiving a horizontal portion of a fork of a lift truck.

14. The clamping apparatus as claimed in claim 1, wherein the imaginary solid can extend to any height above the frame without any portion of the apparatus extending into the imaginary solid.

15. The clamping apparatus as claimed in claim 1, wherein the frame has a rectangular inner and outer periphery as viewed in plan and comprises first and second legs extending parallel to each other and third and fourth legs extending parallel to each other and perpendicular to the first and second legs and extending between and secured to the first and second legs, and the clamping apparatus includes:

a first elongated rotating member rotatably supported by the first leg and secured to the lever portion of the first clamping arm for rotation together with the lever portion about the first axis of the lever portion of the first clamping arm;

a first actuator supported by the third leg of the frame and operatively connected to the first rotating member to rotate the rotating member about the first axis of the lever portion of the first clamping arm;

a second elongated rotating member rotatably supported by the second leg of the frame and secured to the lever portion of the second clamping arm for rotation together with the lever portion about the first axis of the lever portion of the second clamping arm; and a second actuator supported by the fourth leg of the frame and operatively connected to the second rotating member to rotate the second rotating member about the first axis of the lever portion of the second clamping arm.

16. The clamping apparatus as claimed in claim 15, wherein the first actuator is a hydraulic cylinder extending parallel to the second leg of the frame as viewed in plan and the second actuator is a hydraulic cylinder extending parallel to the fourth leg of the frame as viewed in plan.

17. The clamping apparatus as claimed in claim 16, wherein each of the actuators is mounted on an underside of the frame.

18. The clamping apparatus as claimed in claim 1, wherein each of the contact portions comprises an elongated rigid panel having an inner surface for opposing the load and an outer surface, and a pair of mounting lugs secured to the outer surface of the rigid panel and pivotably connected to the lower end of the corresponding lever portion and the lower end of the corresponding control rod.

19. A clamping apparatus comprising:

a frame having an opening;

first and second opposing clamping arms pivotably mounted on the frame for pivoting with respect to the frame towards and away from each other about first and second parallel horizontal axes, respectively, each of the first and second clamping arms having a contact portion at its lower end;

third and fourth opposing clamping arms pivotably mounted on the frame for pivoting with respect to the frame towards and away from each other about third and fourth parallel horizontal axes, respectively, the third and fourth axes extending perpendicular to the first and second axes, each of the third and fourth clamping arms having a contact portion at its lower end; and a plurality of actuators connected to the clamping arms for pivoting the first and second clamping arms towards and away from each other and pivoting the third and fourth clamping arms towards and away from each other, wherein the clamping apparatus can be disposed with respect to a load having a rectangular shape as viewed in plan and measuring at least 24×24 inches as viewed in plan with the frame extending around an entire outer periphery of the load as viewed in plan and with the load extending through the opening in the frame from below the frame to at least 12 inches above the frame, and in this state the clamping arms can be pivoted with respect to the frame so that the contact portions of all four clamping arms contact a different side of the load at the same time, and each of the clamping arms comprises a 4-bar linkage including a lever portion having an upper end pivotably supported by the frame for pivoting with respect to the frame about a first horizontal axis and a lower end pivotably connected to the contact portion for pivoting with respect to the contact portion about a second axis parallel to the first axis, and a control rod having a lower end pivotably connected to the contact portion for pivoting with respect to the contact portion about a third axis parallel to the first axis and an upper end pivotably supported by the frame for pivoting with respect to the frame about a fourth axis parallel to the first axis.

* * * * *

UNITED STATES PATENT AND TRADEMARK OFFICE

CERTIFICATE OF CORRECTION

PATENT NO. : 8,814,238 B2
APPLICATION NO. : 13/444072
DATED : August 26, 2014
INVENTOR(S) : Edward Tygard It is certified that error appears in the above-identified patent and that said Letters Patent is hereby corrected as shown below:

In the Claims:

Column 8, line 58 (claim 1, line 12), change “horizontal, axes” to --horizontal axes--.

Signed and Sealed this
Twenty-first Day of October, 2014

Michelle K. Lee
*Deputy Director of the United States Patent and Trademark Office*